United States Patent [19]

Masada

[11] Patent Number: 5,012,074
[45] Date of Patent: Apr. 30, 1991

[54] APPARATUS FOR SECURING AN IC-CARD ISSUING STATION

[75] Inventor: Shigeo Masada, Itami, Japan

[73] Assignee: Mitsubishi Denki Kabushiki Kaisha, Tokyo, Japan

[21] Appl. No.: 168,695

[22] Filed: Mar. 16, 1988

[30] Foreign Application Priority Data

Mar. 24, 1987 [JP] Japan .................................. 62-69830

[51] Int. Cl.[5] .............................................. G06F 15/30
[52] U.S. Cl. .................................... 235/379; 235/380; 235/492
[58] Field of Search ............... 235/379, 380, 441, 492; 902/26

[56] References Cited

U.S. PATENT DOCUMENTS

4,650,975 3/1987 Kitchener ......................... 902/26 X
4,882,474 11/1989 Anderl et al. ........................ 235/380

FOREIGN PATENT DOCUMENTS

61-177589 8/1986 Japan .
61-202280 9/1986 Japan .
61-217866 9/1986 Japan .

Primary Examiner—David Trafton
Attorney, Agent, or Firm—Leydig, Voit & Mayer

[57] ABSTRACT

The invention is directed to providing an improved security system for stations issuing IC cards. In accordance with the improved system, two independent codes transmitted from remote locations must match codes retained at the issuing station and on the IC card prior to the system allowing the issuing station to be activated. In particular, a manufacturer's identification code is entered into the IC card prior to the cards leaving the control of the manufacturer. The card issuer provides a secured area wherein a issuer's identification code is maintained. Upon issuance of an IC card, both the manufacturer's and issuer's codes must be transmitted to the station and verified by the corresponding codes maintained at the station and onboard the memory of the IC card before the station will allow an account number to be written into the memory of the IC card. Preferably, the system includes a transmission path from the station to the location where the manufacturer's codes are maintained. Upon the issuance of an IC card, the manufacturer is informed of the card's issuance so that an accurate record may be maintained for all of the cards delivered to an issuer.

13 Claims, 2 Drawing Sheets

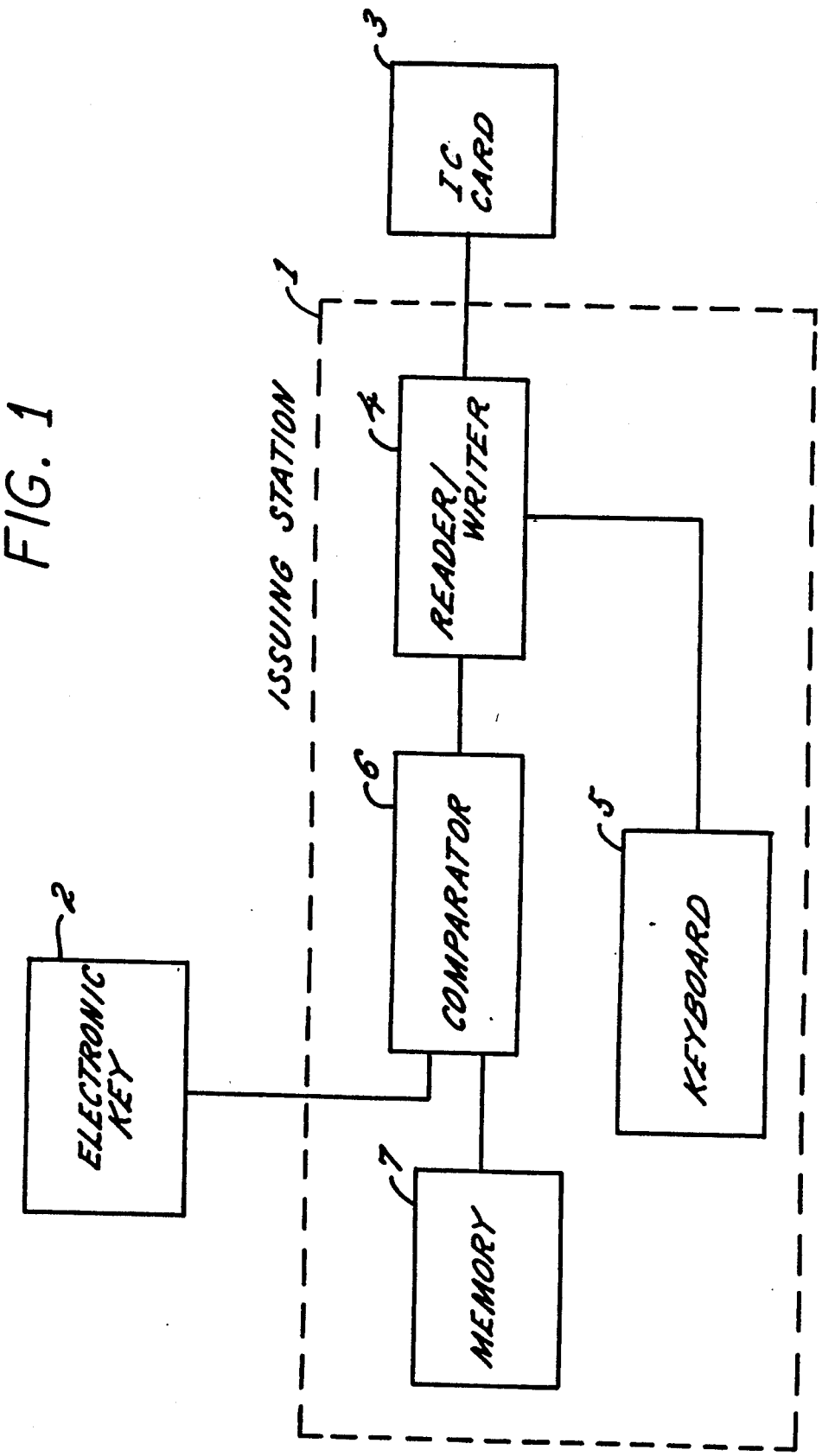

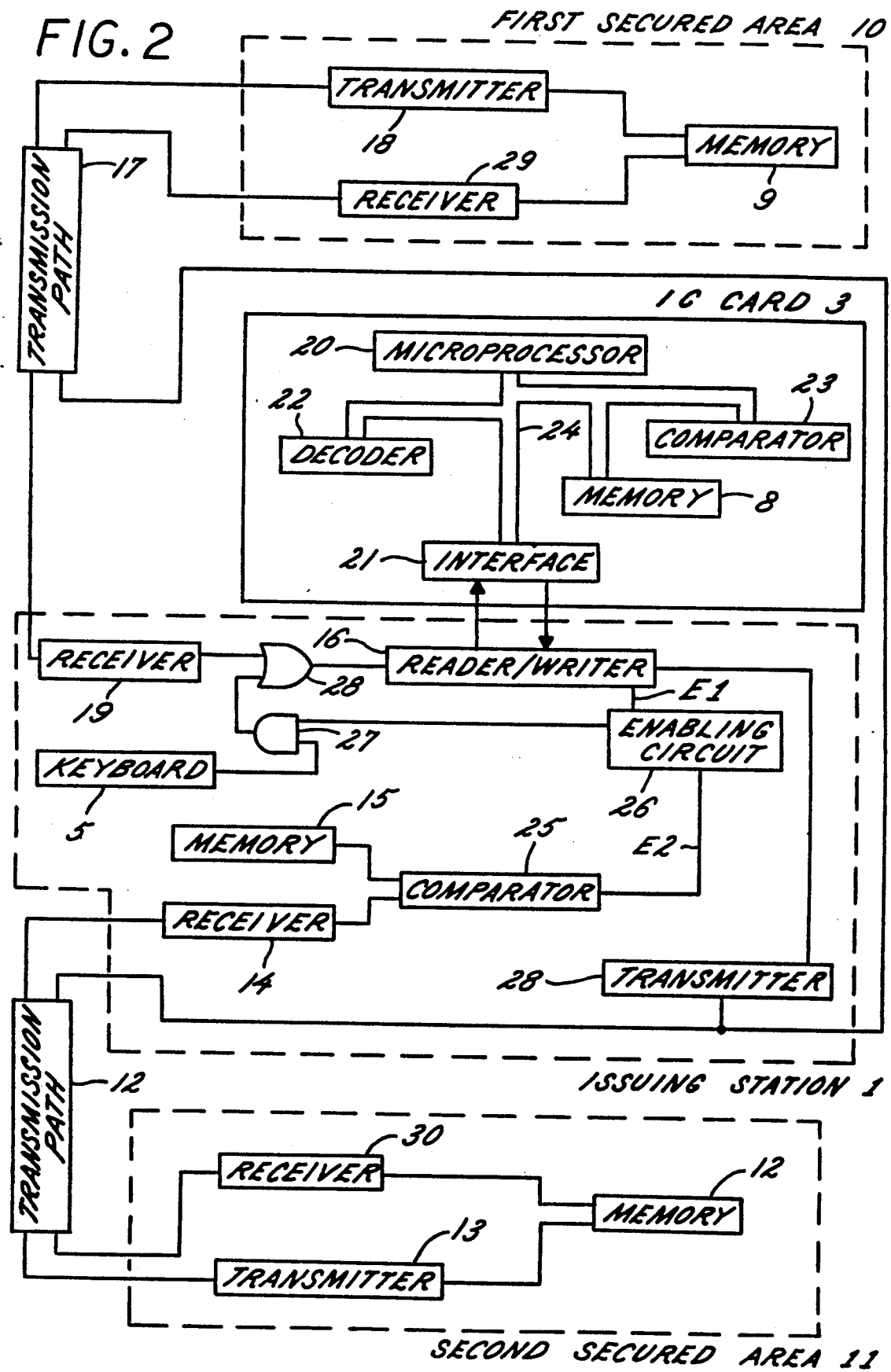

ND_COUNT# 5,012,074

APPARATUS FOR SECURING AN IC-CARD ISSUING STATION

TECHNICAL FIELD

The invention generally relates to IC cards of the type having an onboard microprocessor and memory, and more particularly, to an apparatus for issuing the IC cards in a manner that discourages forgeries.

BACKGROUND OF THE INVENTION

IC cards are most commonly issued by writing an identification number or bank account number into the memory of the card. When the card is used, the identification or account number serves to verify and record a transaction using the card. In order to prevent unauthorized issuance of an IC card, the apparatus for writing the identification or account number into the memory of the IC card is typically controlled by an issuer code.

In one approach, the code is recorded in an EPROM that is fitted into a housing adapted to serve as a plug-in module received by a receptacle at the issuing station. For an IC card to be issued, the user of the issuing station must obtain the EPROM from a secured area and plug it into the receptacle. When activated, the issuing station will read the information from the EPROM and compare it with information stored in an internal memory for the purpose of determining whether a data match exists. If the information matches, the apparatus indicates to the user that it is ready to write an identification or account number into the IC card.

Essentially, the EPROM device acts as an electronic key that prevents unauthorized use of the issuing station. Although such an electronic key is more secure than a conventional mechanical key, it nevertheless is still susceptible to unauthorized use or duplication. Such unauthorized use or duplication allows the issuing apparatus to be used to issue unauthorized cards.

SUMMARY OF THE INVENTION

In view of the foregoing, it is a general aim of the present invention to provide an apparatus for issuing IC cards which makes it virtually impossible for an operator of an issuing station, acting alone, to issue unauthorized IC cards. In this connection, it is a more particular object of the invention to prevent unauthorized use of the issuer's code for activating the issuing station.

It is another object of the invention to ensure that forged IC cards cannot be used in an issuing station.

To this end, there is provided a system at an issuing station for issuing IC cards in which the card manufacturer records a manufacturing code on the card and separately transmits the manufacturing code to an issuing station. The system includes a first device for receiving the manufacturer's code from a secured source (e.g., the manufacturer's office) and comparing the received code with a code written into a memory location on the IC card. The code in the IC card is written into an onboard memory by the manufacturer prior to its leaving the manufacturer's control. In response to a determination that the received code matches the code in the onboard memory, a first signal is generated by the device, indicating an authorized IC card is present.

The system also includes a second device that is responsive to data received from another secured source (e.g., an issuer control station) for comparing the data to an issuer's identification code stored at the issuing station. When a match between the received data and the stored identification code is detected by the second device, a second signal is generated indicating the issuer is authorized to write into the memory of the IC card.

In response to the presence of both the first and second signals, a third device enables the issuing station to write an identification or account number in and issue the authorized IC card.

Other objects and advantages will become from the following detailed description when taken in conjunction with the drawings.

BRIEF DESCRIPTION OF THE DRAWINGS

FIG. 1 is a block diagram of a conventional card issuing apparatus; and

FIG. 2 is a block diagram of a card issuing apparatus in accordance with the preferred embodiment of the present invention.

While the invention will be described in connection with a preferred embodiment, there is no intent to limit it to that embodiment. On the contrary, the intent is to cover all alternatives, modifications and equivalents included within the spirit and scope of the invention as defined by the appended claims.

DESCRIPTION OF THE PREFERRED EMBODIMENT

Turning to the drawings and referring first to FIG. 1, a conventional IC-card issuing station 1 is secured by an electronic key 2 that is adapted to be coupled to the station by way of a receptacle (not shown). The electronic key 2 includes a storage device (e.g., EPROM) that contains data intended to duplicate an issuer's identification code stored at the issuing station 1. Before the issuing station can be enabled to enable to write an identification or account number into an IC card 3, the data stored in the electronic key 2 must be determined to match the user's identification code. In order to implement a secured system, the electronic key 2 is held in the custody of a system administrator who delivers the key to an operator for the activation or issuance of a card. After the card is activated (i.e., an identification or account number is entered), the key 2 is removed by the operator and returned to the system administrator.

To enable the writing of identification or account numbers into the IC cards, the issuing station 1 includes a reader/writer 4, well known in the art, which receives the IC card 3. With the IC card 3 and electronic key 2 in place, the issuer may enter the identification or account number into the microprocessor-based electronics carried on the IC card by typing the number into a keyboard 5. Data generated by the keyboard 5 is delivered to the onboard microprocessor system via the reader/writer 4. In order to ensure that only authorized identification or account numbers are entered into an card's microprocessor memory, a comparator 6 enables the reader/writer 4 only when the user's identification code data held in the electronic key 2 matches the coded data stored onboard the issuing station 1 in a memory 7 such as an EPROM.

As previously indicated, the conventional issuing station 1 as illustrated in FIG. 1 is susceptible to the issuance of forged IC cards by dishonest operators. Specifically, the electronic key 2 may be stolen or copied. Also, counterfeit IC cards may be manufactured and activated by the card issuing system by dishonest operators cooperating with the counterfeiters.

In accordance with the present invention, the foregoing security problems are overcome by providing an IC card issuing station that writes an identification or account number to an IC card only when data received from secured manufacturer and issuer sources are matched with manufacturer's and issuer's identification codes at the issuing station. Prior to leaving the manufacturer's control, the memory onboard each IC card is provided with a manufacturer's code. In a complementary fashion, the issuing station is provided with a memory containing an issuer's identification code. In order to enable the issuing station to write an identification or account number into a selected IC card, the data delivered from the secured manufacturer and issuer sources must match the codes contained in both the memories of the IC card and the issuing station. If both codes are not matched, the issuing station will not be permitted to issue the IC card by writing an identification or account number into its onboard memory.

Referring to the illustrated embodiment of the invention in FIG. 2, when an issuer gives a manufacturer an order for the IC card 3, a manufacturer's code is entered into a memory device 8 onboard the IC card. The manufacturer's code is also entered into an external memory 9 located in a first secured area 10, preferably at the manufacturer's location and in a ciphered format.

A second secured area 11, preferably a control station located on the issuer's premises, includes a memory 12 containing an issuer's identification code. Unlike the prior art system of FIG. 1, the issuer's identification code is retained in the second secured area 11 and linked to an issuing station 1 via a transmission path 12. The transmission path 12 may be hard wired between complementary transmitting and receiving devices 13 and 14 at the second secured area and the issuing station, respectively, or it may be a telephone link established by modems at both ends of the transmission path. A memory 15 onboard the issuing station 1 contains an issuer's identification code that complements the one stored in the memory 12 located in the second secured area.

When the IC card 3 is to be issued, the operator places the card in a reader/writer 16 of conventional construction. The operator then requests the administrator of the second secured area 11 to enable the issuing station. In response to this request, the administrator contacts the manufacturer to initiate transmission of the manufacturer's identification code from the memory 9 of the first secured area 10 to the issuing station 1 via a transmission path 17. As contemplated, transmission of the manufacturer's identification code from the first secured area 10 may be initiated via a conversation over ordinary telephone lines between the administrators of the two secured areas 10 and 11, or it may be fully automated requiring no human involvement. The security considerations of particular implementations of the invention may dictate the type of communications network most desired for initiating transmission of the manufacturer's code.

In the illustrated embodiment, the manufacturer's identification code is transmitted when a transmitter 18 within the first secured area 10 is keyed. The hard wired transmission path 17 delivers the manufacturer's code to the reader/writer 16 via a receiver 19 at the issuing station 1. In turn, the code is delivered by the reader/writer 16 to the microprocessor 20 onboard the IC card via an interface 21 of conventional design. Under program control, the microprocessor 20 sends the data received from the first secured source 10 to a decoder 22 onboard the IC card. The decoder 22 deciphers the manufacturer's identification code. It is then delivered to a comparator 23 onboard the card via a bus line 24. Also delivered to the comparator 23 is the data stored in the onboard memory 8. If the comparator 23 detects a match between the manufacturer's identification code and the data from the memory 8, a first enable signal E1 is provided from the comparator to the issuing station 1 via the interface 21 and reader/writer 16.

As will be appreciated by those skilled in the art of designing IC cards, the architecture illustrated for the microprocessor-based electronics onboard the IC card 3 is conventional. Although the comparator 23 and decoder 22 are illustrated as devices separate from the microprocessor 20, it should be understood that they typically are implemented by registers inside the microprocessor, under program control.

In keeping with the invention, when transmission of the manufacturer's identification code from the first secured area 10 is initiated, transmission of the issuer's identification code is also initiated from the second secured area 11. The receiver 14 transfers the issuer's code from the transmission path 12 to a comparator 25 onboard the issuing station 1. At the comparator 25, the received issuer's identification code is compared to the data held in the onboard memory 15. If the code and data match, a second enabling signal E2 is generated by a comparator 25.

In order to detect when both the first and second enabling signals E1 and E2 have been generated by their respective comparators 23 and 25, a logical AND function is performed on the outputs of the comparators at enabling circuit 26. With both enabling signals present, the enabling circuit 26 activates the reader/writer 16 for delivering an identification or accounting number to the IC card in response to the operator's entry of the number on the keyboard 5.

In the illustrated embodiment, a two-input AND gate 27 receives the outputs from the keyboard 5 and the enabling circuit 26. Until a match of manufacturer's and issuer's codes is detected, the output from the enabling circuit 26 blocks the gate and prevents keyboard data from flowing to the reader/writer 16. In order to allow the entry of the manufacturer's identification code into the reader/writer 16 while the keyboard 5 is disabled, the illustrated embodiment utilizes an OR gate 28 that receives the output of the AND gate 27 and of the receiver 19.

Upon completion of the writing of the identification or accounting number into the memory 8 of the IC card 3, the reader/writer 16 keys a transmitter 28 for sending a signal indicative of the completed task to both the first and second secured areas 10 and 11. The reader/writer 16 may key the transmitter in a number of ways. Most typically, issuing systems provide an indication to the operator when the writing of an identification or account number into the onboard memory 8 has been successfully completed. In the illustrated embodiment, it is contemplated that this entry verification signal be used to key the transmitter 28.

Reception of the entry verification signal from the transmitter 28 by the receivers 29 and 30 at the first and second secured areas 10 and 11, respectively, allows a count of the issued IC cards to be maintained at the manufacturer's and/or the issuer's secured areas. By assigning each IC card a unique manufacturer's identification code, the signal received from the transmitter 28 by the receiver 29 at the first secured area 10 may be used to indicate and record that a particular one of the IC cards delivered to an issuer has been activated.

From the foregoing, it will be appreciated that controlling the enablement of an IC-card issuing station by requiring the issuing station to correctly identify codes from a least two independent secured areas results in a secured issuing station that is not susceptible to easy activation of counterfeit IC cards. Furthermore, the requirement that an issuing station recognize two independent codes makes it extremely unlikely that any one individual can successfully issue unauthorized or counterfeit cards. By entering a code in the memory of the IC card at the manufacturer's facilities, the operator of the issuing station has no chance of knowing the code. Correspondingly, no one at the manufacturer's secured area knows the user's code.

It will be appreciated by those skilled in the art that the memory 8 on the IC card 3 containing the manufacturer's identification code and the memory 15 onboard the issuing station 1 containing the user's identification code may be copy guarded in order to prevent easy access to the memory contents. An example of a simple copy-guard scheme is the inclusion in the system of hardware or software decoders (not shown) so that the codes in the memories 8 and 15 may be ciphered. In the illustrated embodiment, the manufacturer's identification code transmitted from the first secured area 10 is ciphered because the first secured area is preferably remotely located and the transmission path typically involves the use of telephone lines or an RF link that may be easily intercepted.

What is claimed is:

1. A system at an issuing station for issuing IC cards in which the card manufacturer records a manufacturing code in the card and separately transmits the manufacturing code to an issuing station from a secured source, said system comprising in combination:
   manufacturer authorization checking means responsive to the manufacturing code recorded in said card and including means for receiving the manufacturing code from the manufacturer, said manufacturer authorization checking means including means for comparing the received and recorded manufacturing codes, and means for producing an authorized card signal when a match is detected between said received and recorded manufacturing codes, thereby identifying the presence of an authorized card;
   issuer validity checking means for receiving an issuer identification code from a secured control room and comparing the received issuer identification code with an issuer identification code stored in a memory at the issuing station, said issuer validity checking means producing an issuer authorized signal when a match is detected between said received and stored issuer identification codes; and
   means responsive to the presence of both said authorized card and issuer authorized signals for enabling said issuing station to record information in and issue said card.

2. A system as set forth in claim 1 including a decoder onboard said card for receiving said manufacturing code in a ciphered form from said card manufacturer.

3. A system as set forth in claim 1 including means for notifying said card manufacturer upon the successful completion of issuing said card.

4. A system as set forth in claim 1 wherein said comparing means is located onboard said card.

5. A system as set forth in claim 1 wherein said card manufacturer and said secured control room are remotely located from said issuing station and connected to said issuing station by first and second transmission paths, respectively.

6. A system as set forth in claim 5 wherein said first transmission path is completed by a transmitter at said card manufacturer and a receiver at said issuing station.

7. A system as set forth in claim 6 wherein said issuing station includes a keyboard and said means responsive to the presence of both said authorized card and issuer authorized signals include means for enabling said keyboard only in response to the presence of both said authorized card and issuer authorized signals.

8. A method for securing an IC card issuing station containing a manufacturer's identification code in a memory onboard said IC cards, said method comprising the steps of:
   receiving at said issuing station an issuer's identification code from a first secured source and comparing said code with issuer's identification code stored in memory at said issuing station so as to provide a first enabling signal when said issuer's identification codes are complementary.
   receiving said manufacturer's code from a second secured source and comparing it with said manufacturer's identification code onboard said IC card so as to provide a second enabling signal when said received and onboard manufacturer's codes complement one another; and
   responding to the presence of both first and second enabling signals by enabling said issuing station to issue said IC card.

9. A system for preventing the issuance of forged IC cards comprising in combination;
   an issuing station for receiving an IC card having a first memory containing a manufacturer's identification code;
   a first secured area remotely located from said issuing station and having a second memory containing said manufacturer's identification code;
   a transmission path coupling said issuing station and said first secured area;
   said first secured area including means for transmitting the manufacturer's identification code contained in said second memory to said issuing station via the transmission path;
   a second secured area remotely located from said issuing station and having a third memory containing an issuer's identification code;
   said issuing station including a fourth memory containing an issuer's identification code;
   a transmission path coupling said issuing station and said second secured area;
   said second secured area including means for transmitting said issuer's identification code contained in said third memory to said issuing station; and
   said issuing station including (1) means to receive said manufacturer's identification code and said issuer's identification code transmitted from first and second secured areas, respectively, (2) means for reading the manufacturer's identification code and the issuer's identification code contained in said first memory onboard said IC card and said fourth memory respectively, and (3) means for issuing said IC card only when said manufacturer's identification code and issuer's identification code transmitted from said first and second secured areas respectively, correspond to the manufacturer's and issuer's identification codes read from said first and fourth memories, respectively.

10. A system as set forth in claim 9 including a decoder onboard said IC card for receiving said manufacturer's code in a ciphered form from said first secured area.

11. A system as set forth in claim 9 wherein said means for issuing said IC card includes means for comparing the manufacturer's identification code transmitted from said first secured area with said manufacturer's identification code read from said first memory and means for comparing the issuer's identification code from said second secured area with said issuer's identification code read from said fourth memory and means responsive to both said comparing means for enabling a keyboard of said issuing station to issue said IC card only when there is a correspondence between both the manufacturer's identification codes and the issuer's identification codes.

12. A system as set forth in claim 11 wherein said means for comparing the manufacturer's identification codes is located onboard said IC card.

13. A system as set forth in claim 9 including means for notifying said first secured area upon the successful completion of issuing said IC card.

* * * * *